Jan. 17, 1950     J. THÉVENAZ     2,494,842
DEVICE FOR CINEMATOGRAPHIC APPARATUS INTENDED FOR RESTORING
AUTOMATICALLY THE LENGTH OF THE FILM LOOP COMPRISED
BETWEEN THE OBJECTIVE AND THE DRIVING ROLLER
Filed Feb. 8, 1949     2 Sheets-Sheet 2
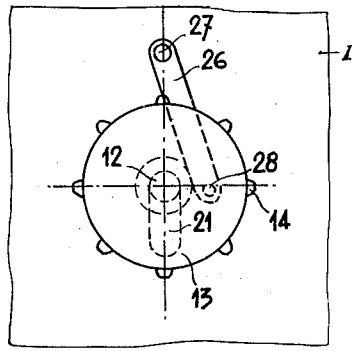
Fig. 8
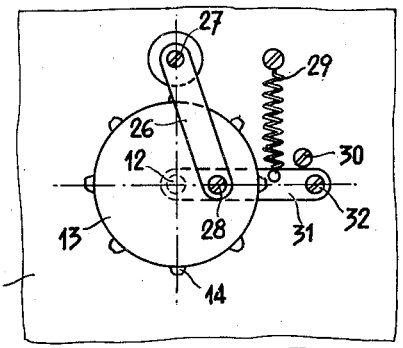
Fig. 9
Fig. 10
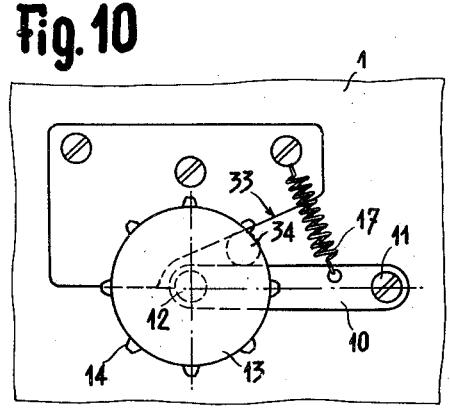
Fig. 11
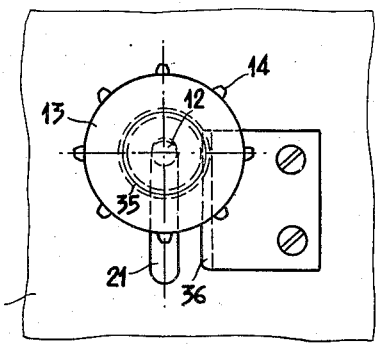
Fig. 12
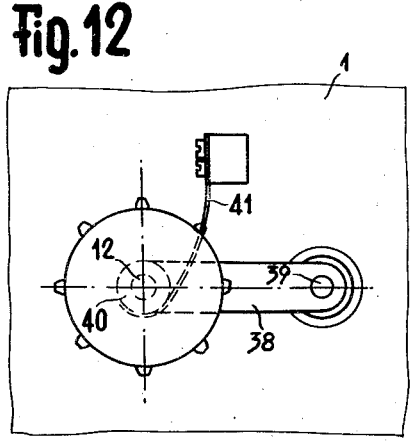
Fig. 13
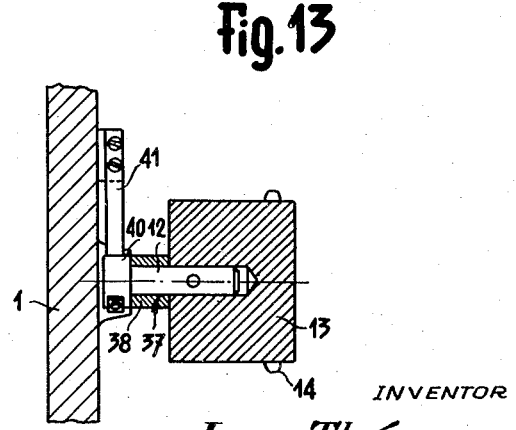
INVENTOR
Jean Thévenaz.
BY 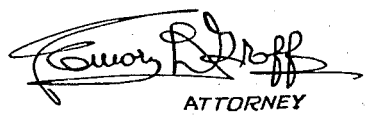
ATTORNEY Patented Jan. 17, 1950

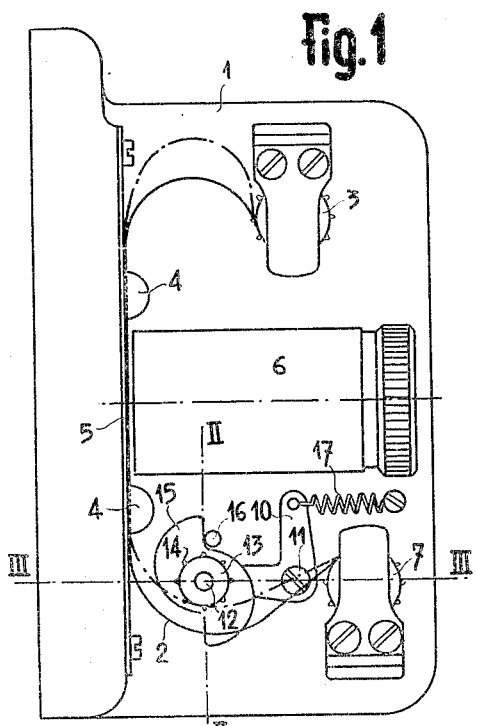
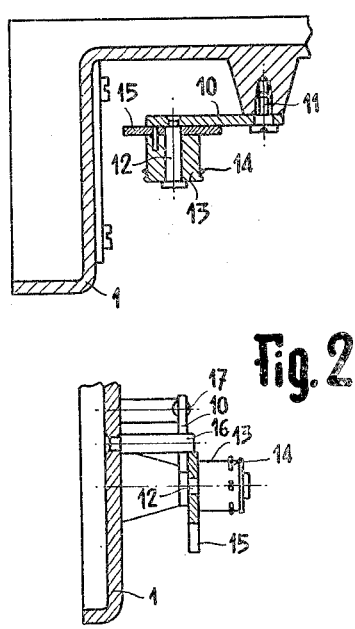
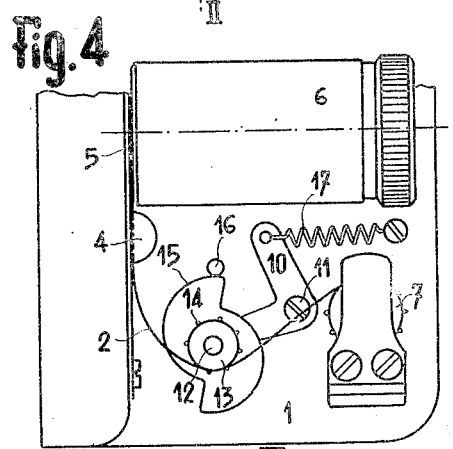
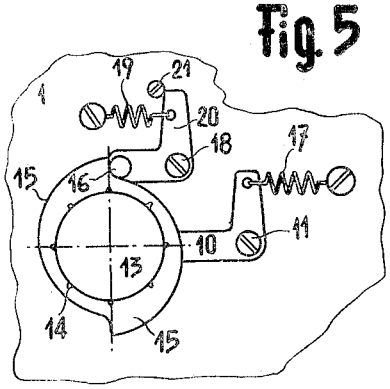
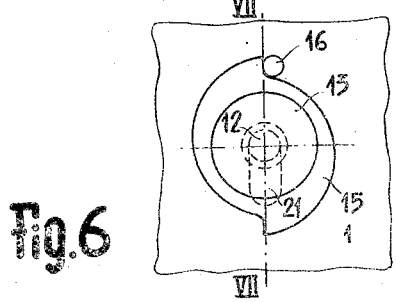
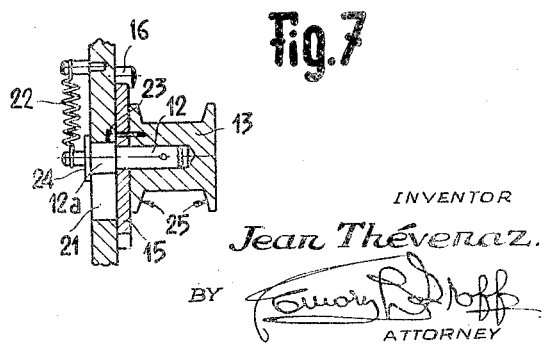

2,494,842

UNITED STATES PATENT OFFICE 2,494,842

DEVICE FOR CINEMATOGRAPHIC APPARATUS INTENDED FOR RESTORING AUTOMATICALLY THE LENGTH OF THE FILM LOOP COMPRISED BETWEEN THE OBJECTIVE AND THE DRIVING ROLLER

Jean Thévenaz, Yverdon, Switzerland, assignor to Paillard S. A., Sainte-Croix, Switzerland, a corporation of Switzerland Application February 8, 1949, Serial No. 75,192
In Switzerland April 1, 1948

9 Claims. (Cl. 88—17)

In the cinematographic apparatus now in use, the portion of film situated in front of the objective is driven in a jerky movement by an advancement device including one or several claws meshing with the film perforations. Before and after the objective, the film is drawn at constant speed by driving rollers. In order to permit the jerky movement of the film in front of the objective, two elastic loops are necessary in the path of the film between the objective and each of the driving rollers.

Now, when as a result of a deterioration of the film between the perforations, the loop decreases in length and becomes too small for sufficiently compensating the differences in the speed of the film on the driving roller and in front of the objective, serious trouble follows. In the first place, the movement is no longer jerky, and in the second place the film can tear. To avoid such trouble, certain designers have fitted their apparatus with devices restoring automatically the length of the lower loop.

Some of these devices include a feeler operated by the film when the lower loop reaches a dimension which is considered too small. The operation of this feeler provokes the engaging of the two parts of a coupling mechanically connecting the motor of the cinematographic apparatus to an extension organ of the loop formed by the film.

These devices are in general relatively complicated and they present dangers to the operator in case of wrong handling, owing to the fact that the driving energy operating the feeler or the extension organ is considerable, because it is directly supplied by the motor of the apparatus.

Other known devices include an eccentric roller arranged inside the loop formed by the film and kept, by a calling back spring in a rest position for which its greater radius is situated, in relation to the rotation axle, on the side opposite to the loop. When the latter, for a casual reason, decreases in length, the film comes in contact with the roller at the place of its smaller radius and drives said roller in rotation around its axle. This axle being eccentric, it is clear that the rotation of the roller restores the loop to its desired length. This device, of very simple design and construction, does not, however, give full satisfaction, because the resulting drawing force acting on the film, as well as the value of the roller's driving torque, are very variable, and for certain positions of the roller, are even unfavourable for the working of the device. In addition, to meet the operating requirements, the overall dimensions of the device are considerable.

The present invention relates to a device for cinematographic apparatus intended for restoring automatically the length of the loop formed by the film between the objective and the driving roller and including, for the loop, a restoring organ which is normally kept out of engagement from the film and intended to come in contact and to be operated by the latter when, for a casual reason, the said loop decreases in length. This device differs from the known devices in that the said restoring organ is connected to the frame by mechanical elements imparting to it, when actuated by the film, a combined translation and rotation movement.

The attached drawing shows diagrammatically and by way of example a few forms of execution of the device in accordance with the invention.

Fig. 1 is a part side view of a cinematographic apparatus fitted with the device in accordance with a first form of execution, said device being in the rest position.

Fig. 2 is a part cross-section view along the line II—II of Fig. 1.

Fig. 3 is a part cross-section view along the line III—III of Fig. 1.

Fig. 4 is a view similar to that of Fig. 1, the device being in a position corresponding to that occupied at the end of its working.

Fig. 5 is a view of a first alternative execution of the device shown on Fig. 1.

Fig. 6 is a view of a second form of execution of the device.

Fig. 7 is a cross-section view of same along the line VII—VII of Fig. 6.

Figs. 8 to 12 are views of five other forms of execution of the device shown on Fig. 1.

Fig. 13 is a cross-section view along the line XIII—XIII of Fig. 12.

According to the attached drawing, and like most known cinematographic apparatus, the one partly shown has a frame 1 (see Figs. 1 and 4) carrying the various organs necessary for shooting or projecting. The film 2 coming from a reel, which is not shown, passes on a first sprocket 3 driven in rotation at constant speed by the motor (not shown) of the apparatus. The film 2 then passes in guides 4 arranged on either side of a gate 5 intended to keep the portion of film situated in front of the objective 6 in a well defined position in relation to the latter. In the gate 5 act the claws (not shown) driving the film in a jerky translation movement.

When leaving the passage 5, the film 2 is again taken up by a second sprocket 7 driven in rotation at constant speed by the motor of the apparatus. Between each sprocket 3, 7 and the objective 6, the film forms a loop. The device intended to restore the length of the lower loop is arranged between the objective 6 and the second sprocket 7, because only the loop formed by the film when leaving the passage 5 decreases in length when, for a casual reason (such, for instance, as a deterioration of the film between the perforations), the advancement device of the film no longer provokes the jerky advancing of the film portion situated in front of the objective.

In the form of execution shown on Figs. 1 to 4, this device includes a revolving organ 13 consisting of a roller fitted with teeth 14 intended to mesh with the film perforations when a decrease in length of the lower loop formed by the film leaving the gate 5 occurs.

This roller is mechanically connected to the frame 1 by mechanical elements imparting, when it is driven in rotation by the film, a translation movement to its rotation axle. For this purpose the roller 13 is pivoting on an axle 12 carried by a lever 10 hinged at 11 to the frame 1 and subjected to the action of a spring 17. The latter tends to keep the profile of a cam 15, fastened to the roller 13, in contact with a finger 16 fixed to the frame 1.

The working of the described device is very simple. When the lower loop formed by the film 2 decreases in length, the film comes in contact with the roller 13 (position shown in dash and dot lines on Fig. 1) and the teeth 14 mesh with the film perforations. The latter, drawn at constant linear speed by the sprocket 7, drives the roller 13 in a counter clockwise rotation movement around the axle 12. The cam 15 fixed to the roller 13 is also driven in rotation and its profile acts in conjunction with the finger 16. In consequence, the rotation axis of the roller 13 is displaced in a way parallel to itself against the action of the calling back spring 17 and makes an arc of circle of which the centre is at 11. During this translation displacement, the roller 13 pulls the film 2 through the gate 5.

After a rotation of about half a turn of the roller 13 around its axle 12, the cam 15 occupies the position shown on Fig. 4 and the roller 13 occupies its extreme lower position for which the length of the loop formed by the film is restored. When afterwards the finger 16 escapes from the profile of the cam 15, the calling back spring 17 causes a rocking of the lever 10 in a clockwise direction and brings back the whole of the device in its rest position, shown on Fig. 1.

It is clear that after the above described restoring of the length of the loop, the cinematographic apparatus can again work normally, because the damaged portion of film, which was situated at the place of the claws, has been replaced by the following portion.

Practical tests made on a cinematographic apparatus fitted with the described device have proved that the latter can be easily achieved in overall dimensions small enough to permit its easy placing on a cinematographic projection apparatus or shooting camera and in addition, that the working of the described device is generally perfect.

In the alternative form of execution of the Fig. 5, the finger 16 is carried by an auxiliary lever 20 hinged on 18 to the frame 1. This lever 20 is subjected to the action of a spring 19 tending to keep the finger 16 in contact with the profile of the cam 15. The rest position of the lever 20 is defined by a stop 21.

The working of this safety device is as follows:

When the resistance offered by the film to its advancement reaches, for a casual reason, a value considered dangerous for the film, the cam slides over the finger 16 and pushes back the latter against the action of its spring 19. The lever 10 can then remain in a fixed angular position, or even rock in a clockwise direction in spite of the angular displacement of the roller 13 around its axle 12.

In the form of execution shown on Figs. 6 and 7, the roller 13 and the cam 15 are carried by the axle 12 which has an extension 12a engaged in a port 21 made in the wall of the frame 1. This port constitutes a guide for the translation displacements of the axle 12. A calling back spring 22, acting on the axle 12, tends to keep it in contact with the end 23 of the port 21 which defines the rest position of the device.

The axial position of the axle 12 is defined by the cam 15 and a collar 24 resting respectively on either side of the wall of the frame.

The roller 13 has conical jaws 25 between which the film goes jamming.

When the roller 13 is driven in rotation by the film 2, the profile of the cam 15 acts in conjunction with the finger 16 and pushes back the axle 12 which slides inside the port 21 against the action of the spring 22.

In the form of execution in accordance with Fig. 8, the roller 13 is carried by the axle 12 engaged in the port 21 and subjected to the action of a spring, in exactly the same way as in the form of execution of the Figs. 6 and 7. However, the cam 15 and the finger 16 are here replaced by a connecting rod 26 hinged to the frame 1 by means of a pivot 27 and to the roller 13 by means of a journal 28 eccentrically fixed on the roller 13. This journal 28 fastened on one of the front faces of the roller 13 constitutes a crank in relation to the axle 12. It is clear that in an alternative design, this journal 28 could be carried by an arm fastened to the roller 13.

In the form of execution in accordance with Fig. 9, the roller 13 revolves on an axle 12 carried by a lever 31 hinged on 32 to the frame 1 and subjected to the action of a spring 29. A stop 30 defines the rest position of the lever 31. In addition, the roller 13 is connected to the frame by means of a connecting rod 26 hinged on 27 to the frame 1 and at 28 to the roller 13. This form of execution is in fact a combination of the forms of execution shown on Figs. 1 and 8.

In an alternative design, each of the connecting rods 26 and 31 could be hinged to the roller by means of a journal having an eccentric position in relation to the rotation axle of the roller 13.

In the form of execution in accordance with Fig. 10, the roller 13 rolls on the axle 12 carried by the lever 10 subjected to the action of the spring 17. The latter tends to keep a finger 34, eccentrically fixed to the roller 13, in contact with the profile of a cam 33 rigidly fixed to the frame 1. The working of this form of execution is similar to that of the device shown on Fig. 1.

In the form of execution in accordance with Fig. 11, the roller 13 is carried by the axle 12 engaged in the port 21 and subjected to the action of a spring in the same way than with the form of execution of Figs. 6 and 7. However, the axle 12 carries a cog 35 co-axial to the axle 12 and fastened to the roller 13. This cog is in mesh with a rack 36 rigidly fixed to the frame 1 and parallel with the port 21.

In an alternative design, the rack could be replaced by a cog and the roller 13 could be replaced by an arm subjected to the action of a spring and pivoting on the frame in the axis of the said cog.

In the form of execution in accordance with Figs. 12 and 13, the roller 13 is carried by the axle 12 which revolves in a bearing 37 arranged at the end of a lever 38 hinged to the frame 1 by means of a pivot 39. This axle 12 carries a drum 40 fastened to the roller 13 and co-axial to the latter. On the periphery of this drum is fixed one of the ends of an elastic band 41, of which the other end is rigidly fixed to the frame 1. It is clear that the driving in rotation of the roller 13 by the film provokes an unrolling of the band 41 and therefore a displacement of the axle 12 against the elastic action of the band along an arc of circle having the pivot 39 as centre.

The device in accordance with the invention can be designed and achieved in many other manners and only a few typical forms of execution have been described here by way of example and with reference to the attached drawing.

I claim:

1. In a cinematographic apparatus comprising a frame an objective, a driving sprocket for the film, a film loop between said objective and said driving sprocket, a device for restoring the length of said film loop including a restoring sprocket normally kept out of mesh with said film and engageable with and to be operated by said film when for a casual reason the length of said film loop decreases, means supporting said restoring sprocket and movably mounted on said frame, yieldable means connected to said supporting means and frame and urging said restoring sprocket to a predetermined position disengaged from said film loop, a restoring member connected to said restoring sprocket and reacting against the frame and upon engagement of said film loop with said restoring sprocket moving same from its predetermined position to thereby lengthen the loop.

2. In a cinematographic apparatus comprising a frame an objective, a driving sprocket for the film, a film loop between said objective and said driving sprocket, a device for restoring the length of said film loop including a restoring sprocket normally kept out of mesh with said film and engageable with and to be operated by said film when for a casual reason the length of said film loop decreases, an axle for said restoring sprocket and urged to a predetermined position, a restoring member connected to said restoring sprocket and operable upon engagement of said restoring sprocket with said film loop to move said sprocket and said axle from its predetermined position to thereby lengthen the film loop.

3. In a cinematographic apparatus comprising a frame an objective, a driving sprocket for the film, a film loop between said objective and said driving sprocket, a device for restoring the length of said film loop including a restoring sprocket normally kept out of mesh with said film and engageable with and to be operated by said film when for a casual reason the length of said film loop decreases, an axle for said restoring sprocket, means guiding said axle along a predetermined path, yieldable means urging the axle to a predetermined position on said path, and a restoring member revolving about said axle and connected to the restoring sprocket and reacting on the frame.

4. In a cinematographic apparatus as claimed in claim 3, in which said restoring member is a cam element and a finger element is mounted on the frame and the yieldable means urges one of said elements to engage the other.

5. In a cinematographic apparatus as claimed in claim 3, in which said guiding means in a lever fulcrumed to said frame and connected to said restoring sprocket and the restoring member is a connecting rod pivoted at one end to said frame and at the other end eccentrically to said restoring sprocket.

6. In a cinematographic apparatus as claimed in claim 3 and wherein the yieldable means is connected to the frame and the means guiding the axle.

7. In a cinematographic apparatus as claimed in claim 3, in which said guiding means include a lever hinged to the frame of said apparatus, and the axle is carried by said lever, said restoring member revolving on said axle.

8. In a cinematographic apparatus as claimed in claim 3, in which said guiding means include a guide fastened on the frame of said apparatus, the yieldable means is fastened on the axle of said restoring sprocket, said yieldable means and said guide cooperating one with the other.

9. In a device as claimed in claim 2 and comprising two connecting rods both hinged to the frame and the restoring sprocket, one of said connecting rods carrying said restoring sprocket concentrically and the other eccentrically connected to the restoring sprocket.

JEAN THÉVENAZ.

REFERENCES CITED

The following references are of record in the file of this patent:

UNITED STATES PATENTS

| Number | Name | Date |
|---|---|---|
| 2,332,079 | Hoehn | Oct. 19, 1943 |
| 2,407,795 | Nelson | Sept. 17, 1946 |
| 2,418,361 | McNabb | Apr. 1, 1947 |
| 2,434,355 | Fairbanks | Jan. 13, 1948 |